US009328021B2

(12) United States Patent
Jardine et al.

(10) Patent No.: US 9,328,021 B2
(45) Date of Patent: *May 3, 2016

(54) BIOMASS DERIVED GRINDING AIDS

(71) Applicant: W. R. Grace & Co.-Conn., Columbia, MD (US)

(72) Inventors: Leslie A. Jardine, Burlington, MA (US); Charlotte Porteneuve, New York, NY (US); Gerard Blond, Lille (FR)

(73) Assignee: GCP Applied Technologies Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,429

(22) Filed: Mar. 16, 2015

(65) Prior Publication Data

US 2016/0068437 A1 Mar. 10, 2016

Related U.S. Application Data

(63) Continuation of application No. 14/482,600, filed on Sep. 10, 2014, now Pat. No. 8,979,998.

(51) Int. Cl.
*C04B 7/52* (2006.01)
*C04B 16/00* (2006.01)
*C04B 24/12* (2006.01)
*C04B 24/02* (2006.01)

(52) U.S. Cl.
CPC .............. *C04B 24/122* (2013.01); *C04B 24/02* (2013.01)

(58) Field of Classification Search
CPC .................................. C04B 7/52; C04B 16/00
See application file for complete search history.

(56) References Cited

U.S. PATENT DOCUMENTS

| | | | |
|---|---|---|---|
| 3,615,785 A | 10/1971 | Moorer et al. | |
| 3,819,389 A | 6/1974 | Uchikawa et al. | |
| 4,011,092 A | 3/1977 | Yue | |
| 4,204,877 A | 5/1980 | Moorer et al. | |
| 4,432,801 A | 2/1984 | Tegiacchi et al. | |
| 4,711,401 A | 12/1987 | Serafin | |
| 4,990,190 A | 2/1991 | Myers et al. | |
| 5,184,680 A | 2/1993 | Totten et al. | |
| 5,348,583 A | 9/1994 | Arfaei et al. | |
| 5,620,877 A | 4/1997 | Farone et al. | |
| 5,897,995 A | 4/1999 | Vroemen et al. | |
| 6,110,271 A | 8/2000 | Skaggs et al. | |
| 6,224,250 B1 | 5/2001 | Kreinhede et al. | |
| 6,380,138 B1 | 4/2002 | Ischy et al. | |
| 6,790,275 B2 | 9/2004 | Macklin et al. | |
| 6,797,050 B2 | 9/2004 | Hoffman et al. | |
| 6,872,247 B1 | 3/2005 | Jardine et al. | |
| 6,890,451 B2 | 5/2005 | Sapienza et al. | |
| 6,916,369 B2 | 7/2005 | Chun et al. | |
| 7,108,800 B2 | 9/2006 | Tran et al. | |
| 8,979,998 B2 * | 3/2015 | Jardine et al. | 106/757 |
| 2005/0031719 A1 | 2/2005 | Hoffman et al. | |
| 2005/0253108 A1 | 11/2005 | Tran et al. | |
| 2006/0272554 A1 * | 12/2006 | Jardine et al. | 106/823 |
| 2014/0299022 A1 * | 10/2014 | Honert et al. | 106/505 |

FOREIGN PATENT DOCUMENTS

| | | |
|---|---|---|
| CA | 882166 | 9/1971 |
| DE | 159874 | 4/1983 |
| EP | 0228274 | 3/1992 |
| EP | 0437331 | 10/1994 |
| EP | 0554046 | 10/1997 |
| EP | 0936201 | 8/2003 |
| EP | 1491516 | 12/2004 |
| EP | 1505048 | 2/2005 |
| EP | 1661871 | 5/2006 |
| GB | 2241499 | 9/1991 |
| JP | 50035218 | 4/1975 |
| JP | 55142084 | 11/1980 |
| JP | 57100952 | 6/1982 |
| JP | 61031334 | 2/1986 |
| JP | 3021409 | 1/1991 |
| JP | 2002371388 | 12/2002 |
| KR | 2003049614 | 6/2003 |
| RU | 2081083 | 6/1997 |
| SU | 402519 | 10/1973 |
| SU | 443008 | 9/1974 |
| SU | 1130548 | 12/1984 |
| SU | 1217829 | 3/1986 |
| SU | 1271843 | 11/1986 |
| SU | 1296275 | 3/1987 |
| SU | 1458345 | 2/1989 |
| SU | 1557127 | 4/1990 |
| SU | 1604773 | 11/1990 |
| SU | 1648920 | 5/1991 |
| SU | 1664972 | 7/1991 |
| TW | 228509 | 8/1994 |
| WO | 00/31174 | 6/2000 |
| WO | 03064576 | 8/2003 |
| WO | 2004101137 | 11/2004 |
| WO | 2006/051574 | 5/2006 |

OTHER PUBLICATIONS

Buscher, European Search Report, European patent application No. EP 06252854, Jan. 10, 2011, 9 pp.
International Preliminary Report on Patentability (Chapter I of the Patent Cooperation Treaty) for PCT/US2006/018607 dated Dec. 6, 2007, 6 pages.
International Search Report for PCT/US2006/018607 dated Jul. 26, 2007, 2 pages.

(Continued)

*Primary Examiner* — Paul Marcantoni
(74) *Attorney, Agent, or Firm* — Craig K. Leon

(57) ABSTRACT

Compositions and methods for increasing grinding efficiency of cement, cement clinker, raw materials for cement, and other inorganic particles. Use of biomass-derived polyols such as diols, triols, or mixtures thereof, optionally with a conventional grinding aid, cement quality improver, and/or hexavalent chromium reducer, are believed to provide less risk of sludging when compared to glycerides obtained from fossil fuel sources.

12 Claims, No Drawings

(56) References Cited

OTHER PUBLICATIONS

Written Opinion of the International Searching Authority for PCT/US2006/018607 dated Jul. 26, 2007, 6 pages.
Demirbas, "Biodiesel fuels from vegetable oils via catalytic and non-catalytic supercritical alcohol transesterifications and other methods: a survey", Energy Conversion & Management, 44 (2003) 2093-2109.
Canakci, "Biodiesel production via acid catalysis", Department of Mechanical Engineering, Iowa State University, Ames, IA, USA. Transactions of the ASAE (1999), 42(5), 1203-1210, abstract only.
Grace Raw Material specification for GYCE, dated Apr. 12, 1989.

* cited by examiner

BIOMASS DERIVED GRINDING AIDS

This is a continuation application based on U.S. Ser. No. 13/785,657, filed Mar. 5, 2013, which was a divisional application based on Ser. No. 13/035,164, which was filed Feb. 25, 2011, which was a divisional application based on Ser. No. 11/434,018, which was filed May 15, 2006, and which issued as U.S. Pat. No. 7,922,811 B2, which claimed benefit of provisional application No. 60/686,803 filed Jun. 2, 2005.

FIELD OF THE INVENTION

The present invention relates to methods and compositions pertaining to the grinding of cement and cementitious materials, such as cement clinker to produce cement, raw materials for making cement clinker, blast furnace slag, and other particulates; and, more particularly, to the use in grinding operations of compositions and methods employing polyols (e.g., diols, and/or triols) that are derived from the conversion of biomass sources such as plant and animal materials.

BACKGROUND OF THE INVENTION

In the process of manufacturing hydraulic cements such as Portland cement, a grinding operation is used to reduce cement particles to relatively smaller particle sizes. A spherical starting material called "clinker," which essentially consists of hydraulic calcium silicates, calcium aluminates, and calcium aluminoferrite, is mixed with small amounts of gypsum and ground into finely divided particles. As the grinding of clinker to produce the cement consumes substantial quantities of time and energy, it is common practice in the cement industry to employ grinding aids which increase the efficiency of the grinding operation, thereby lowering the power required to grind a unit of cement or alternatively, to increase the output of cement to accommodate high cement demands. The addition of a grinding aid enables the mill to grind the clinker to a smaller size with less energy by prohibiting the buildup of a coating of finer material on the grinding media and walls of the mill by coating the nascent surfaces of the cement clinker.

In U.S. Pat. No. 3,615,785, Moorer et al. disclosed the use of polyglycerols as additives for the grinding manufacture of hydraulic cement, and preferably polyglycerols selected from the group of di-, tri-, and tetraglycerol and mixtures thereof.

The term "glycerol" is often used interchangeably with the terms "glycerin" and "glycerine." However, more properly speaking, the term "glycerol" applies to the pure chemical compound 1,2,3-propanetriol, while the terms "glycerin" and "glycerine" apply to the purified commercial products normally containing 95% or more of glycerol. A large portion of the commercial supply of glycerin is produced by esterifying fats with methanol in the production of methyl esters. The present inventors believe that such glycerin has been used as an admixture in cement and concrete compositions, but until the present invention glycerin esterified from animal or plant fats has not been used as a grinding aid for cements, cement clinker, or other raw materials used for making cement.

Crude and waste glycerins obtained as a by-product (though not related to biofuel production as in the present invention) have been used previously for cement grinding. One such glycerol blend was described in SU-1604773. A crude polyglycerin derived from fossil fuel processing was previously used by W. R. Grace & Co.-Conn. in grinding aid additive formulations sometime in the 1980's. However, the purity of the glycerin in terms of glycerol level was about 50%, and thus care was needed during formulation with other grinding aid components to prevent sludging. Other uses of glycerin residues, crude glycerins, and waste glycerins in cement applications are described in SU-1271843 and SU-1130548. These materials are believed to contain glycerols of various molecular weights, and most contain salts such as sodium chloride in a quantity up to 15%. The high level of polyglycerins reduces the grinding aid efficiency of crude glycerins obtained from such processes.

SUMMARY OF THE INVENTION

The present inventors have discovered that the use of polyols, preferably low molecular weight diols and/or triols which are derived from the conversion of biomass sources ("biomass-derived polyols"), provides advantages when compared to glycerins derived from fossil fuel sources in terms of enhancing the efficiency of grinding processes wherein cement, cement clinker, raw materials such as blast furnace slag, limestone, clay, shale, sand, and others are ground into finer particle sizes.

For example, a preferred biomass-derived glycerin obtained from the manufacture of biodiesel fuel and be suitably used as a cement grinding aid. This biomass-derived glycerin is believed to provide an advantage for grinding cement and other materials, as compared to glycerin derived from fossil fuels, because it has higher amounts of pure glycerol. It also is believed to have less of a tendency to sludge because it is less likely to have detrimental amounts of higher molecular weight components such as polyglycerols (wherein two or more glycerol groups are connected by ether linkages).

From an economic perspective, it is often advantageous to employ low cost streams of small polar organic molecules as a cement grinding aid. Although the cost of petroleum based fuel is still less expensive for consumers than biofuels produced from vegetable and plant materials, biofuel-derived glycerin involves renewable natural resources, a fact that may well be more attractive to cement manufacturers in the near future.

Biomass-derived polyol cement grinding aids of the present invention are also believed to inhibit pack setting of the cement and cementitious particles after grinding. In other words, the biomass-derived polyols are also believed to reduce the amount of energy that might be necessary to initiate flow in the cement, and this is important when unloading the dry cement powder from storage silos or bins, or after shipment of the cement in trucks, barges, or railroad hopper cars. This tendency to pack set is inhibited by reduction in the high surface energy of the cement produced upon grinding.

An exemplary method of the invention thus comprises introducing to inorganic particles (to be ground into finer particle sizes) a grinding aid composition comprising at least one biomass-derived polyol selected from diols, triols, or mixture thereof.

A preferred grinding aid composition of the invention comprises at least 50-95% and more preferably at least 80% level glycerol (1,2,3-propanetriol) contained in glycerin derived from a biomass source. This biomass-derived polyol-containing composition may be added separately or together with one or more conventional cement grinding aids, and/or one or more conventional cement quality improvers (e.g., cement hydration control agent), and/or other cement additives such as hexavalent chromium reducing agents, and added into the grinding mill operation during or before the grinding of the particles.

Another exemplary grinding aid composition of the invention comprises (A) a biomass-derived polyol, such as glycerin derived from biofuel production; and (B) at least one additional component (i.e., conventional cement additive) selected from the group consisting of glycol (where the polyol is glycerol); triethanolamine, acetic acid or salt thereof, tri isopropanolamine, sodium acetate, diethanolisopropanolamine, tetrahydroxylethylene diamine, carbohydrates, polycarboxylate ethers, air entraining agents, chloride, nitrite, and nitrate.

A further exemplary grinding aid composition of the invention comprises (A) a biomass-derived polyol, such as glycerin derived from biofuel production; and (B) at least one water-reducing additive. Exemplary water-reducing additives comprise lignosulfonate (e.g., calcium lignosulfonate), a naphthalene sulfonate formaldehyde condensate, a melamine sulfonate formaldehyde condensate, or mixture thereof.

A still further exemplary grinding aid composition of the invention comprises (A) a biomass-derived polyol, such as glycerin derived from biofuel production; and (B) at least one hexavalent chromium reducer.

The use of crude biomass-derived polyols, such as crude glycerin derived from inedible tallow or refined soybean oil, for example, may have high amounts of fatty acids which might make them unsuitable for grinding cement clinker to produce cement, but this particularly crude form of the glycerin is believed to be suitable for the milling of raw materials, such as limestone, clay, shale, and/or sand which is used for making clinker.

In still further grinding aid compositions of the invention, a biomass-derived polyol may be used in combination with at least one other additive, or combination of additives, comprising a conventional cement additive, a water-reducing additive, and/or a hexavalent chromium reducer.

Methods which incorporate the aforementioned compositions into grinding operations, along with further advantages, features, and embodiments of the invention, are described in further detail hereinafter.

DETAILED DESCRIPTION OF PREFERRED EMBODIMENTS

The term "biomass" means any organic matter available on a renewable basis, including dedicated energy crops and trees, agricultural food and feed crops, agricultural crop wastes and residues, wood wastes and residues, aquatic plants, animal wastes, municipal wastes, and other waste materials.

The term "biofuel" as used herein may be used interchangeably with the term "biodiesel fuel" herein.

The term "grinding" shall include milling or comminution of particles to reduce their average size and to increase the surface area per unit mass of material. Methods of the invention for grinding particles include the use of rotating ball mills or rotary kilns in which the particles are pulverized. The methods may also involve mills which employ rollers (rotating cylinders) for crushing the particles. For example, the rollers may be used in a paired, nipped configuration, through which the particles are passed and crushed. The rollers may alternatively be used upon a horizontal surface, such as a circular table, on which a bed of particles are crushed as the rollers are rotated over the table surface.

The term "particles" as used herein includes hydratable cement and cement clinker which is ground, often with gypsum and calcium sulfate, to produce hydratable cement. The present invention not only concerns the grinding of clinker to produce cement, and the grinding of cement particles into still finer particles, but also the grinding of the raw materials which go into the production of the cement clinker. Such raw materials are commonly known to include calcite, limestone, aragonite, sea shells, marl, limonite, clay, shale, sand, and bauxite. See e.g., *Concrete Admixtures*, Vance Dodson (Van Nostrand Reinhold, New York, N.Y. 1990), page 4.

As previously mentioned, the present invention involves the use of polyols derived from the conversion of biomass sources such as animal and/or plant materials for the purpose of grinding inorganic particles into smaller particle sizes.

Biomass-derived polyols of this invention may include the water-soluble diols such as ethylene glycol, propylene glycol, polyethylene glycol, polypropylene glycol, diethylene glycol, triethylene glycol, dipropylene glycol and tripropylene glycol, mixtures of any or all of these glycols, their derivatives, and reaction products formed by reacting ethylene and propylene oxide or polyethylene glycols and polypropylene glycols with active hydrogen base compounds (e.g., polyalcohols, polycarboxylic acids, polyamines, or polyphenols). Other glycols contemplated for use in the present invention include neopentyl glycol, pentanediols, butanediols, and such unsaturated diols as butyne diols and butene diols. Most preferred are the polyglycols of ethylene and propylene.

The derivation of polyols from biomasses has been achieved on an industrial scale for quite some time. For example, International Polyol Chemicals, Inc. ("IPCI") began two decades ago to focus on developing new "green" chemical process technology to produce industrial glycols (such as ethylene glycol, propylene glycol, butanediols and glycerin) from sugars of any type. Previously these products came primarily from petroleum sources. In tropical areas, tapioca, cane sugar, and molasses are preferred. Unusual sugars, such as lactose, which is a cheese manufacturing whey by-product, is also a potential feedstock candidate. Plant or vegetable fibers as well can be either enzyme or acid hydrolyzed to sugars which also can be a feedstock in glycol production. The IPCI process is believed to have two basic steps: namely, (1) continuous catalytic hydrogenation of glucose or monomer sugars to sorbitol; and (2) continuous catalytic hydrocracking of sorbitol to glycols. The resultant glycols are then usually separated by distillation, and typically used in the food, cosmetic, and pharmaceutical industries. The present inventors believe that such biomass-derived polyols can be used for enhancing the grinding of cement, cement clinker, raw materials such as slag, and other particles into finer particulate sizes.

Another biomass source for providing polyols for purposes of the invention is animal manure. With 160 million tons of it produced annually in the United States, most of it rich in carbohydrate components, the present inventors view this as a source of five- and six-carbon sugars that can be converted to diols and/or triols through any number of known catalytic means. This process, of course, is less desirable than using agricultural biomass feedstocks, such as wheat wastes, which are comprised mostly of clean carbohydrates. The Pacific Northwest National Laboratory ("PNNL"), a U.S. Department of Energy facility in Washington State, has been successful in converting animal wastes into chemicals and has developed various catalytic approaches for converting other low-value biobased materials to chemicals, such as the wastes and by-products resulting from processing corn, wheat, potatoes and dairy products. Such by-products, if not in a diol or triol form, can be converted into diols and/or triols, through known methods.

Biomass-derived triols may be obtained from the processes above, but the most preferred triol is glycerol obtained as a by-product from the production of biofuel because of the high levels of glycerol, and, as previously mentioned, relatively low or non-existent levels of polyglycerides. If polyglycerides are also to be present along with pure glycerol from conversion of the particular biomass source, then the inventors prefer smaller glycerides over larger ones (i.e., diglycerides being most preferred).

"Biofuel-derived polyols" such as glycerin (which contains glycerol) are among the preferred biomass-derived polyols of the present invention. Processes for making biofuels from plant and/or animal oils are known, and crude glycerins useful as grinding aids can be obtained as a direct by-product from such processes (e.g., precipitation). For example, the transesterification of plant and animal oils to produce biofuels is described by Demirbas in 'Biodiesel Fuels From Vegetable Oils Via Catalytic and Non-Catalytic Supercritical Alcohol Transesterification And Other Methods: A Survey." A process for transesterification of vegetable or animal oils is also described in European Patent Application EP 1 505 048 A1 of Thierry Lacome et al. A variety of plant and animal sources, which can be used for making biofuels, can also be found in the literature.

Transesterification is the process of using an alcohol (e.g., methanol, ethanol, butanol) in the presence of a catalyst, such as sodium hydroxide or potassium hydroxide, to break the molecule of the raw renewable oil chemically into methyl or ethyl esters of the renewable oil, with glycerol as a by-product. Biodiesel, which is made of mono-alkyl esters of fatty acids derived from vegetable oil or animal fat, can then be separated from the glycerin, usually as a result of the addition or presence of salts after the transesterification reaction (e.g., Triblycerides+Monohydric alcohol>Glycerin+Mono-alkyl esters). The transesterification can be alkali catalyzed, acid catalyzed, and can take place in ethanol or methanol. Demirbas also describes formulation of biofuel through saponification and pyrolysis with glycerin as a byproduct.

The crude glycerins favored in the present invention need not necessarily be limited to biofuel derivation, however. The present inventors believe that any glycerol from glycerides (natural glycerol) derived from plant or animal sources through soap manufacture, fatty acid production, and fatty ester production can yield various amounts of crude glycerins. However, the present inventors believe that fatty ester production provides the highest level of glycerol; and therefore glycerins as the by-product of fatty ester production is most preferred. Glycerins derived from fatty ester production often have acceptable levels of chloride salts (up to 15% by total weight) which are not believed to be detrimental to the final ground cement product for purposes of the present invention.

Samples of crude glycerin obtained from the production of biofuels can have purity levels up to 92% and even 95% glycerol, the remainder believed to comprise salts such as sodium and/or potassium chloride, and thus do not require purification, as is often the case with fossil-fuel derived glycerins.

In exemplary grinding aid compositions comprising biomass-derived diols, triols, or mixture thereof, such biomass-derived portion should preferably have an average molecular weight of about 50-200. Indeed, if diols and triols are blended together, the present inventors believe that it may be possible that the composition will be applicable as a grinding aid over a wider range in cement types, for example.

Exemplary compositions of the present invention thus comprise: (A) at least one biomass-derived diol, at least one biomass-derived triol, or a mixture thereof; and (B) at least one conventional grinding aid component such as a glycol (where component A is a glycerol), triethanolamine, acetic acid or salt thereof, triisopropanolamine, sodium acetate, diethanolisopropanolamine, tetrahydroxyethylethylene diamine, carbohydrates, polycarboxylate ethers, air entraining agents, as well as chloride salt, nitrite salt, or nitrate salt. For example, component A may comprise 10-90% while component B comprises 90-10%, all percentages based on weight of the composition.

In preferred grinding methods and grind aid compositions of the invention, a biomass-derived polyol such as biofuel-derived crude glycerin should preferably contain a little or no ash. The amount of ash should preferably be less than 50%, more preferably less than 15%, and most preferably less than 10%. The amount of ash may be described in terms of nonglycerol organic matter, or "MONG," which is an acronym for "Matter Organic NonGlycerol." MONG is believed to include fatty acids and esters, trimethylene glycol (TMG), ie. propane-1,3-diol; water; arsenic; and sugars.

Thus, an exemplary composition of the present invention may comprise a biomass-derived diol (10-90%), a biomass-derived triol (90-10%), and a MONG content of 0.005-50%.

A preferred biofuel-derived glycerin suitable as a cement grinding aid is believed to be available from World Energy company. Although the source of the plant or vegetable oil is not known, the glycerin from World Energy is said to contain the following components: glycerin (88%), methanol (0.05%), moisture (8%), total fatty acid content (0.2%), sodium chloride (2%), and "ash" (3%) with a pH of around 6 and sulfate and phosphate content each around 300 parts per million.

Another preferred biofuel-derived glycerin is available from Imperial Western Products, and is believed to be derived from spent fryer grease. This crude glycerin contains the following components: glycerin (91.57-92.19%), methanol (<0.01%), moisture (4.05-5.77%), an unsaponifiable portion (0.056%), and ash 1.03-1.61%), and an insoluble portion of 0.28%).

Another glycerin which is believed to be suitable for cement grinding aid purposes, derived from soapmaking, wherein the source is 85% tallow oil and 15% coconut oil, is available from Trillium Health Care Products—Perth Soap, and contains the following components: glycerin (80%), moisture (12%), sodium chloride (8%), and ash (11%), with a pH of 7-11 and sulfate content of about 2500 parts per million.

A further aspect of this invention is that biomass-derived polyols which, on the one hand, may not be entirely suitable for grinding cement clinker into finished hydratable cement due to low glycerol content, may be suitable for less refined milling or grinding operations, such as where raw materials such as calcite, limestone, aragonite, sea shells, marl, limonite, clay, shale, sand, or bauxite, or a mixture of any of these, are ground in a mill or rotary kiln to produce the cement clinker. Thus, for "raw materials" grinding processes, it is believed suitable to use a biomass-derived polyol available from South Texas Blending company which is derived from inedible tallow and which comprises approximately 50% glycerin with the remainder believed to be a high level of fatty acids. Another biomass-derived polyol is also believed to be available from Soy Solutions comprising glycerin (51%), methanol (6%), and "MONG" (45%).

Preferred exemplary grinding aid compositions of the invention comprise the following components in the percentage ranges indicated (based on total weight of the compositions):

Embodiment 1: water (10-30%), triethanolamine (10-80%), and biofuel-derived glycerin (10-80%).

Embodiment 2: water (10-30%), triisopropanolamine (10-80%), and biofuel-derived glycerin (10-80%).

Embodiment 3: water (0-40%), tin sulfate (40-70%), and biofuel-derived glycerin (10-60%).

Embodiment 4: calcium nitrate (20-40%), calcium nitrite (15-30%), calcium bromide (2-5%), biofuel-derived glycerin (2-10%), and water (25-41%).

Embodiment 5: water (15-65%), sucrose (10-30%), lauryl ether sulfate (5-15%), and biofuel-derived glycerin (20-40%).

In further exemplary compositions and methods of the invention, the biomass-derived polyols (e.g., biofuel-derived glycerin) can be modified by reacting the polyol (e.g., diol such as glycol or triol such as glycerol) with a monobasic carboxylic acid (e.g., acetic acid) to enhance the efficiency of the cement grinding operation. For example, U.S. Pat. No. 4,643,362 of Serafin (owned by the common assignee hereof) taught that diesters formed by reacting a polyol, e.g., mono and polyalkyl diols and triols with a monobasic carboxylic acid (e.g., acetic acid, formic acid, propionic acid) are excellent grinding aids in the grinding of hydraulic cements such as Portland cement. Thus, the present inventors believe that the Serafin modification can also be used to modify biomass-derived polyols of the present invention, including biofuel-derived glycerin, to achieve excellent grinding aids.

In still further exemplary compositions and methods of the invention, the biomass-derived polyols, such as biofuel-derived glycerin, can be substituted, such as by substituting for any of the alcohol radicals (OH), a suitable element or group, such as one of the halogens or an organic ester group. The concept of using substituting glycerols for improving cement grinding efficiency, as well as the properties of the finished cement, was disclosed in U.S. Pat. No. 2,203,809 by Bechtold. The present inventors believe that biomass-derived polyols such as diols and/or triols can be substituted using the Bechtold method to provide good cement grinding efficiency. Thus, preferred biomass-derived polyls include glycerol monochlorohydrin and other like halogen substitution compounds, glycerol mono acetic ester and other corresponding esters of the thyl, propyl, butyl series. Glycerol mono acetic ester is known also as mono-acetin, which has the alpha and beta isomeric forms, either or both of which are believed to be suitable.

The amount of grinding aid can vary within wide limits, but preferably 0.001 to 1.0% by weight (of additive solids) and more particularly 0.005 to 0.05%) by weight of grinding aid is used, based on the weight of the mineral solids (i.e., "solids on solids" or "s/s") that are subjected to grinding. There is no upper limit for the added grinding aid quantity, but, in general, only that quantity required for obtaining the desired surface area in the most efficient mill operation is added.

The biomass-derived polyol grinding aids of the present invention are preferably added alone, but can also be added together with one or more conventional grinding aids, as have been aforementioned, or with other additives.

Further exemplary compositions and methods of the invention further comprise the use of at least one biomass-derived polyol and at least one hexavalent chromium reducing agent, including iron sulfate, tin sulfate, sodium sulfide, sodium sulfite, sodium bisulfite, hydroxylamine sulfate, sodium dithionate, manganese sulfate, an aldehyde, or a mixture thereof.

In further exemplary grinding aid compositions and methods of the invention, at least one (A) biomass-derived polyol may be combined with at least one additive or a mixture of additives selected from (B) conventional cement additives, (C) water-reducing additives, and/or (D) hexavalent chromium additives.

For example, a bio-fuel derived glycerin may be combined with a conventional cement additive such as triethanolamine, triisopropanolamine, or mixture thereof; a water-reducing additive such as a lignosulfonate (e.g., calcium lignosulfonate), naphthalene, sulfonate formaldehyde condensate, melamine sulfonate formaldehyde condensate, or a mixture thereof; a hexavalent chromium reducer such as ioron sulfate, tin sulfate, sodium sulfide, sodium sulfite, sodium bisulfite, hydroxylamine sulfate, sodium dithionate, manganese sulfate, an aldehyde, or a mixture thereof; or any combination of such components.

In further methods of the invention, the biomass-derived polyol may be selected such that it is substantially free of diol, and thus may comprise biomass-derived glycerin (such as biofuel-derived glycerin), and employed as a grinding aid in a raw mill for making cement clinker.

The foregoing discussion is provided for illustrative purposes only, and not intended to limit the scope of the invention.

We claim:

1. A method for grinding particles, comprising:
   introducing to cement clinker particles and limestone particles, in a ball mill or roller mill whereby said particles are ground to have finer average particle size, an aqueous additive composition comprising:
   at least one grinding additive selected from the group consisting of triethanolamine, triisopropanolamine, diethanolisopropanolamine, tetrahyroxyethylthylene diamine, an acetic acid or salt thereof, or mixtures thereof; and
   a crude glycerin obtained derived from biofuel production; and
   wherein the amount of said at least one grinding additive and said crude glycerin derived from biofuel production are in the ratio of 90:10 to 10:90 by weight.

2. The method of claim 1 wherein the crude glycerin comprises glycerin, methanol, water moisture, fatty acid, sodium chloride, sulfate, phosphate, and ash, said ash being present in an amount not exceeding 10% by weight of the aqueous additive composition.

3. The method of claim 1 further comprising introducing a water reducing additive, a chromium reducing additive, or mixture thereof into the ball mill or roller mill.

4. The method of claim 1 wherein the crude glycerin is reacted with a monobasic carboxylic acid.

5. The method of claim 1 wherein the wherein the crude glycerin has one or more substituted OH groups.

6. The method of claim 1 wherein the aqueous additive composition comprising at least one grinding additive and the crude glycerin derived from biofuel production are introduced together as a single additive composition, the additive composition comprising water in the amount of 10%-30% and triethanolamine in an amount of 10%-80%, and said crude glycerin derived from biofuel production comprising 1,2,3-propane triol.

7. The method of claim 1 wherein the aqueous additive composition comprising at least one grinding additive and said crude glycerin derived from biofuel production are introduced together as an additive composition, the additive composition comprising water in the amount of 10%-30% and triisopropanolamine in an amount of 10%-80%, and biofuel derived 1,2,3-propane triol.

8. The method of claim 1 wherein the at least one grinding additive further comprises a glycol.

9. The method of claim 1 wherein the cement clinker and limestone particles are introduced to acetic acid or salt thereof.

10. The method of claim 1 wherein the cement clinker particles and limestone particles are introduced to triethanolamine, triisopropanolamine, diethanolisopropanolamine, tetrahyroxyethylthylene diamine, or a mixture thereof.

11. A method for grinding particles, comprising:
introducing to limestone particles in a ball mill or roller mill whereby said particles are ground to have finer average particle size, an aqueous additive composition comprising:
   at least one grinding additive comprising an acetic acid or salt thereof; and
   a crude glycerin obtained derived from biofuel production; and
   wherein the amount of said at least one grinding additive and said crude glycerin derived from biofuel production are in the ratio of 90:10 to 10:90 by weight.

12. A method for grinding particles, comprising:
introducing to limestone particles in a ball mill or roller mill whereby said particles are ground to have finer average particle size, an aqueous additive composition comprising:
   at least one grinding additive comprising triethanolamine, triisopropanolamine, diethanolisopropanolamine, tetrahyroxyethylthylene diamine, or mixture thereof; and
   a crude glycerin obtained derived from biofuel production; and
   wherein the amount of said at least one grinding additive and said crude glycerin derived from biofuel production are in the ratio of 90:10 to 10:90 by weight.

* * * * *